Apr. 3, 1923.  
E. OLSON  
KNUCKLE JOINT FOR AUTOMOBILE STEERING MECHANISM  
Filed Feb. 10, 1922  
1,450,780
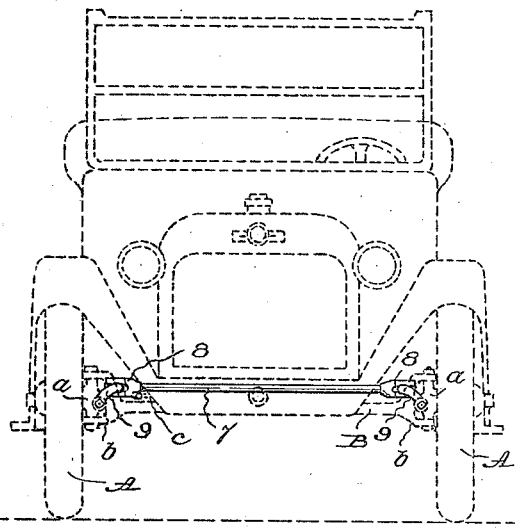
Fig. 1.
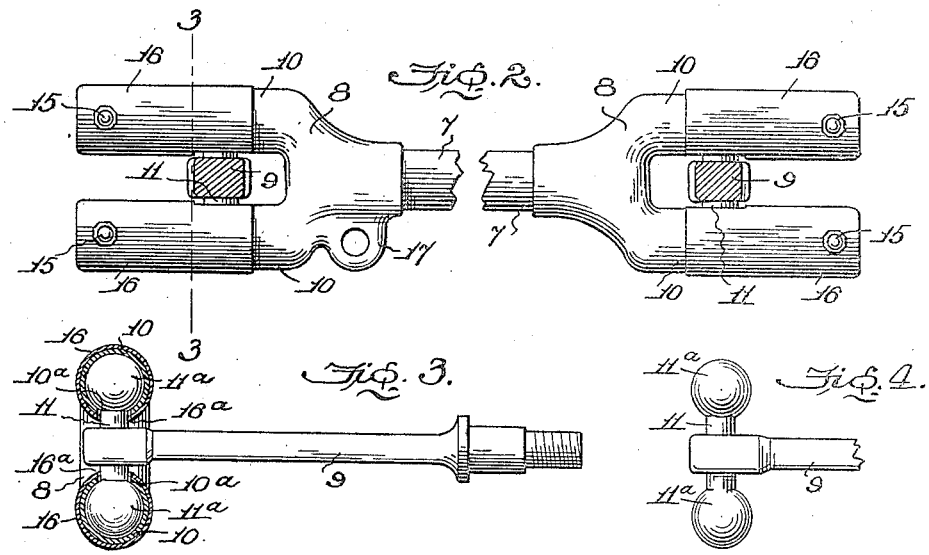
Fig. 2.
Fig. 3.
Fig. 4.
Fig. 5.
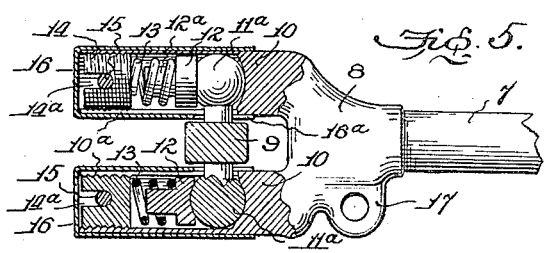
Edward Olson,
INVENTOR.
BY John W Thomas Co.
ATTORNEYS.

Patented Apr. 3, 1923.

1,450,780

UNITED STATES PATENT OFFICE.

EDWARD OLSON, OF MOUNT ALTON, PENNSYLVANIA.

KNUCKLE JOINT FOR AUTOMOBILE STEERING MECHANISM.

Application filed February 10, 1922. Serial No. 535,564.

*To all whom it may concern:*

Be it known that I, EDWARD OLSON, a citizen of the United States, residing at Mount Alton, in the county of McLean and State of Pennsylvania, have invented a Knuckle Joint for Automobile Steering Mechanism, of which the following is a full and complete specification.

In the construction of the running-gear of automobiles or motor vehicles it is customary to connect the front wheels to the ends of the front axle by a pivotal connection, such as a knuckle-joint, so that the vehicle may be guided by turning said front wheels laterally, and to provide for turning them in unison upon manipulation of the steering-wheel of the steering mechanism they are connected by means of a cross-bar and arms, the latter projecting from that member of the knuckle-joint which is carried by the wheel. In the operation of driving the automobile or motor vehicle there is considerable wear on the connections between the cross-bar and arms which not only affects the positive manipulation of the steering-wheel but also results in vibration of the front wheels and consequent rattling of these connections.

It is the primary object of my invention therefore to provide an improved form of connection or joint between the cross-bar of the steering mechanism and arms on the stub-axle of the front wheels that will hold these parts firmly together and automatically take up wear to prevent the possibility of a loose joint and objectionable consequences resulting therefrom.

With this object in view my invention contemplates connecting of the cross-bar and arms by means of a particular form of knuckle-joint in which the arm is provided with a head engaging a seat on a member or yoke at the end of the cross-bar, together with means for pressing the head against its seat to take up wear and insure a tight joint.

My invention further consists in the particular construction and arrangement of the parts constituting the knuckle-joint adapted for the purpose mentioned; all as hereinafter described and specifically set forth in the appended claims.

In the drawings:

Fig. 1 is a front elevation illustrating the application of my invention to an automobile.

Fig. 2 is an enlarged front elevation of the two joints employed at the ends of the cross-bar.

Fig. 3 is a sectional view on the line 3—3 of Fig 2.

Fig. 4 is a detail view of the cross-head at the end of the arm secured to the stub-axle of the wheel.

Fig. 5 is a vertical longitudinal sectional view through my improved knuckle-joint.

Referring to Fig. 1, in which I have shown the application of my invention to an automobile, the front wheels A are connected to the ends of the front axle B by a conventional form of pivotal connection comprising a member $a$ at the inner end of the stub-shaft of the wheel mounted within a yoke $b$ at the end of the axle, and in the present instance the cross-bar 7 of the steering mechanism is provided at its ends with yokes 8 forming a part of my improved knuckle-joint and cooperating with a cross-head, hereinafter described, on the inner end of the arm 9 secured to the aforesaid member $a$ on the stub-axle, the cross-bar being operated from the steering mechanism (not shown) by the usual connecting-rod or drag $c$. The knuckle-joints at both ends of the cross-bar 7 are alike in construction, so that a description of one will apply also to the other, like numerals of reference being employed.

The yoke 8 is provided with members 10, 10, each bored centrally from its outer end to a greater portion of its length and having a longitudinal slot $10^a$ at the inner side, the said bore being round in cross-section to receive the ball-shaped end $11^a$ of a cross-head 11 at the end of the arm 9, and to provide a suitable bearing at the inner end of the bore said inner end is concave, as shown in Fig. 5. As will be understood, the ball-shaped ends of the cross-head on the inner end of the arm 9 are spaced to correspond with the distance apart of the members of the yoke, and that in connecting the parts the stems connecting the ball-shaped ends to the arm occupy the slots in said members with the end of the arm between the latter, whereby a pivotal connection is established between the arm and yoke.

To provide a bearing for the ball-shaped end of the cross-head opposite the bearing at the inner end of the bore in the yoke a bearing piece or follower 12 is inserted into the bore and is preferably held in place by a strong spring 13 encircling a reduced portion or stem 12ª at the outer side of said follower, the inner side of the latter being concave to correspond with the shape of the ball against which it bears. The spring is held under tension by a screw-plug 14 threaded into the outer end of the bore and adjustable to exert a more or less pressure of the bearing piece or follower 12 against the cross-head, and in order to lock this screw-plug in any desired adjustment it is provided with a slot 14ª with which engages a bolt 15 extending transversely through the hollow member of the yoke, the slot 14ª also providing the means for turning the plug by a screw-driver. The parts of the joint which are located within each hollow member of the yoke are protected from dust and dirt by a tubular cap 16 which not only closes the end of the bore but also the major portion of the slot 10ª, said cap in the present instance being extended beyond the cross-head and therefore provided with a slot 16ª to receive the stem of said cross-head. The cap is pierced at opposite sides near its outer end so that the bolt 15 for holding the screw-plug in adjustment may also serve to hold said cap in place.

The yoke at one end of the cross-bar 7 is provided at its inner portion with an apertured boss 17 for the attachment of the connecting-rod or drag $c$ of the steering mechanism, and the arm 9 on the inner end of which the other part of the knuckle-joint is formed is shouldered and threaded at its outer end, as shown in Fig. 3, for attachment to the member $a$ of the wheel-spindle or stub-shaft.

It will be understood that in practice the spiral spring 13 holding the bearing-piece or follower 12 against the cross-head will be sufficiently stout to communicate the shifting movement of the cross-bar to the arm when said cross-bar is moved in one direction in operating the guiding-wheels of the automobile, the bearing of the cross-head being against the inner part of the yoke when the cross-bar is moved in the other direction; but in any event there will be a yielding engagement of the follower to take up any sudden strain on the parts, as for instance when one of the front wheels of the automobile strikes an obstruction on the road, thus preventing the shock or jar being communicated to the steering-wheel. As the spring-pressed bearings for the crosshead of the guiding-arms are opposed to each other, with respect to the two yokes at the ends of the cross-bar, there will be a yielding movement of said cross-bar in either direction under excessive strain. Furthermore, it will be understood that as the bearing-pieces are held tightly against the cross-head any wear on the parts will be taken up automatically so that a tight joint will be maintained to insure a proper operation of the steering mechanism at these points as well as prevent rattling of the joints as in the case of loose connections.

As my improved knuckle-joint takes the place of the ordinary connections between the cross-bar and cooperating guiding arms employed in steering mechanisms the operation of the same will be readily understood, and when employed the steering-wheel is more easily operated by eliminating sudden jerks when the automobile is passing over a rough road, as well as preventing the front wheels from wabbling as in the case of loose connections at these points. The knuckle-joint also provides a strong and durable connection to thereby provide a maximum of safety at these points of the steering mechanism.

Having described my invention I claim:

1. A knuckle-joint for the steering mechanism of automobiles comprising a yoke each member of which is provided with a round bore extending inwardly from its outer end to provide an inner bearing-seat with a slot at the inner side of the member communicating with the bore, a cross-head extending through the slots and having rounded ends seated in the members of the yoke, and yielding bearings engaging the cross-head opposite the aforesaid bearing-seats.

2. A knuckle-joint for the steering mechanism of automobiles comprising a yoke each member of which is provided with a round bore and a slot at one side of the bore, a cross-head extending through the slots and having rounded ends seated in the members of the yoke, movable bearing pieces engaging the cross-head opposite the aforesaid bearing-seats, springs pressing the bearing pieces against the cross-head, and screw plugs engaging the outer ends of the springs.

EDWARD OLSON.